(12) United States Patent
Vasel (10) Patent No.: US 11,492,095 B2
(45) Date of Patent: Nov. 8, 2022

(54) SUPERPLASTIC FORMED AND DIFFUSION BONDED STRUCTURES

(71) Applicant: The Boeing Company, Chicago, IL (US)

(72) Inventor: Corey Vasel, Arnold, MO (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 16/557,613

(22) Filed: Aug. 30, 2019

(65) Prior Publication Data

US 2021/0171184 A1 Jun. 10, 2021

(51) Int. Cl.
*B32B 3/12* (2006.01)
*B64C 3/36* (2006.01)
*B64C 3/26* (2006.01)
*B64C 3/20* (2006.01)
*B32B 15/01* (2006.01)
*B64G 1/22* (2006.01)
*C22C 14/00* (2006.01)

(52) U.S. Cl.
CPC ............... *B64C 3/36* (2013.01); *B32B 3/12* (2013.01); *B32B 15/01* (2013.01); *B64C 3/20* (2013.01); *B64C 3/26* (2013.01); *B32B 2250/03* (2013.01); *B32B 2250/40* (2013.01); *B32B 2605/18* (2013.01); *B64G 1/22* (2013.01); *C22C 14/00* (2013.01)

(58) Field of Classification Search
None
See application file for complete search history.

(56) References Cited

U.S. PATENT DOCUMENTS

| | | | | |
|---|---|---|---|---|
| 3,090,212 A | * | 5/1963 | Anderson | F24F 5/0007 122/6 R |
| 4,197,977 A | * | 4/1980 | Deminet | B21D 26/055 29/890.03 |
| 4,217,397 A | | 8/1980 | Ecklund et al. | |
| 4,304,821 A | * | 12/1981 | Hayase | B21D 26/055 428/116 |
| 5,300,367 A | * | 4/1994 | Bodart | B32B 15/043 428/586 |
| 9,623,977 B2 | | 4/2017 | Runyan et al. | |

* cited by examiner

*Primary Examiner* — Mary I Omori
(74) *Attorney, Agent, or Firm* — Quinn IP Law (57) ABSTRACT

An exterior panel is configured to accommodate high thermal stresses imposed on exterior surfaces of aerospace transport vehicles during hypersonic flight. The exterior panel is formed of a superplastic material such as a titanium alloy, and includes an exterior skin and a plurality of cooling tubes that extend through the panel. The exterior panel further includes an interior skin configured to be attached to a frame member such as a rib, stringer, or spar of the transport vehicle. The tubes pass through a multicellular core, which is sandwiched between the exterior and interior skins to impart tensile and compressive strength to the exterior panel. In one disclosed method, the core is superplastic formed and diffusion bonded to the exterior skin, the tubes, and the interior skin. A cooling fluid, which may be a gas or liquid, including a fuel, may be pumped through the tubes to cool the exterior panel.

19 Claims, 6 Drawing Sheets

SUPERPLASTIC FORMED AND DIFFUSION BONDED STRUCTURES

FIELD

The present disclosure relates to superplastic formed and diffusion bonded (SPF/DB) sandwich structures for aerospace applications.

BACKGROUND

Thermal loads imposed on exterior surfaces of high speed aerospace transport vehicles present significant and continuing demands for improved thermal management strategies.

Exterior structures formed of titanium alloys are known to be effective for accommodating heat flux environments at supersonic speeds. For hypersonic speeds, however, additional cooling mechanisms are sought. Ceramic tiles have been used on spacecraft, particularly for managing thermal loads upon atmospheric reentry from space. Nickel alloys have also been utilized in some structures. However, ceramic and nickel solutions have proven to be heavier and more expensive in terms of their respective structural builds and fuel demands.

Thus, a less costly titanium alloy structure that can effectively provide lower steady-state temperatures at hypersonic speeds is desired, as well as lighter weight solutions than are currently available.

SUMMARY

In accordance with one aspect of the present disclosure, an exterior panel for a transport vehicle includes an exterior skin configured for atmospheric exposure. An interior skin is configured for attachment to a structural frame member of the transport vehicle, and a multicellular core is sandwiched between the exterior skin and the interior skin. A tube extends through the multicellular core adjacent the exterior skin for conveyance of a cooling fluid. The multicellular core is superplastic formed and diffusion bonded to the exterior skin, the tube, and the interior skin.

In accordance with another aspect of the present disclosure, a transport vehicle includes at least one exterior panel having an exterior skin configured for atmospheric exposure. The exterior panel includes an interior skin configured for attachment to a structural frame member of the transport vehicle. A multicellular core is sandwiched between the exterior skin and the interior skin to impart tensile and compressive strength to the exterior panel, and a tube extends through the multicellular core for conveyance of a cooling fluid. The multicellular core is superplastic formed and diffusion bonded to the exterior skin, the tube, and the interior skin.

In accordance with yet another aspect of the present disclosure, a method of manufacturing an exterior panel for a transport vehicle includes providing an exterior skin of a superplastic material configured for atmospheric exposure, and providing and fixing a tube to the exterior skin. The method further includes providing an interior skin of a superplastic material configured for attachment to a structural frame member of the transport vehicle and at least a pair of sheet layers of a superplastic material for forming a multicellular core between the exterior skin and the interior skin. Next the sheet layers are bonded together via intermittent seam welds arrayed in a predetermined pattern. An expansion pipe is secured to one edge of the layers, and a continuous fusion weld is applied about the edges of the sheet layers. The exterior and interior skins are then installed with the sheet layers into a pressure containment device, and an inert gas is supplied into the expansion pipe to superplastic form and diffusion bond (SPF/DB) the skins and layers to create a multicellular core that is integrally bonded to the exterior skin, the tube, and to the interior skin. In the completed SPF/DB structure, the tube extends through the exterior panel as an integral part thereof.

Clause 1: An exterior panel for a transport vehicle, the exterior panel comprising an exterior skin configured for atmospheric exposure; an interior skin configured for attachment to a structural frame member of the transport vehicle; a multicellular core sandwiched between the exterior skin and the interior skin; and a tube extending through the multicellular core, the tube being configured for conveyance of a cooling fluid, wherein the multicellular core is superplastic formed and diffusion bonded to the exterior skin, and the interior skin.

Clause 2: The exterior panel of Clause 1, wherein the tube underlies the exterior skin, and is diffusion bonded thereto, and wherein the tube traverses and is integral with the multicellular core adjacent the exterior skin.

Clause 3: The exterior panel of Clause 1 or 2, wherein the exterior skin, the interior skin, and the multicellular core are formed of a titanium alloy.

Clause 4: The exterior panel of Clause 3, wherein the titanium alloy is a superplastic capable titanium alloy.

Clause 5: The exterior panel of any of Clauses 1-4, wherein the cooling fluid is a fuel.

Clause 6: The exterior panel of any of Clauses 1-5, wherein the tube is configured to convey a cooling gas or a liquid to remove heat from the exterior panel.

Clause 7: The exterior panel of any of Clauses 1-6, wherein the exterior panel is secured to a wing of the transport vehicle.

Clause 8: A transport vehicle having at least one exterior panel, the at least one exterior panel comprising an exterior skin configured for atmospheric exposure; an interior skin configured for attachment to a structural frame member of the transport vehicle; a multicellular core configured to impart tensile and compressive strength to the exterior panel, the multicellular core being sandwiched between the exterior skin and the interior skin; and at least one tube extending through the multicellular core, the tube being configured for conveyance of a cooling fluid, wherein the multicellular core is superplastic formed and diffusion bonded to the exterior skin, and the interior skin.

Clause 9: The transport vehicle of Clause 8, wherein the transport vehicle is a hypersonic vehicle having a plurality of exterior panels, and wherein each exterior panel is joined to at least one other exterior panel by fusion welding.

Clause 10: The transport vehicle of Clause 9, wherein each of the plurality of exterior panels includes at least one tube that underlies the exterior skin of that exterior panel, and is diffusion bonded thereto, and wherein the tube of that exterior panel traverses through, and is integral with, the multicellular core adjacent the exterior skin of that exterior panel.

Clause 11: The transport vehicle of any of Clauses 8-10, wherein the exterior skin, the interior skin, and the multicellular core of the at least one exterior panel are formed of a superplastic capable titanium alloy.

Clause 12: A method of manufacturing an exterior panel for a transport vehicle, the method comprising providing an exterior skin of a superplastic material configured for atmospheric exposure; providing a tube to be fixed proximate to the exterior skin; providing an interior skin of a superplastic material configured for attachment to a structural frame member of the transport vehicle; providing at least one core sheet of a superplastic material for forming a multicellular core between the exterior skin and the interior skin; and installing the exterior skin and the interior skin with the at least the one core sheet layer into a pressure containment device, supplying an inert gas into an expansion pipe to superplastic form and diffusion bond the skins and layers, creating a multicellular core that is integrally bonded to the exterior skin, the tube, and the interior skin; wherein the tube extends through the exterior panel.

Clause 13: The method of Clause 12, further comprising bonding a second core sheet to the at least one core sheet via intermittent seam welds, securing the expansion pipe to one edge of the layers, and applying a continuous weld about the edges of the layers.

Clause 14: The method of Clause 12 or 13, wherein the tube is configured for conveyance of a cooling fluid, including a fuel.

Clause 15: The method of any of Clauses 12-14, wherein the tube is secured to the exterior skin by fusion welding.

Clause 16: The method of any of Clauses 12-15, wherein the tube is formed of a titanium alloy.

Clause 17: The method of any of Clauses 12-16, wherein the tube is formed of a nickel alloy.

Clause 18: The method of any of Clauses 12-17, further including pressurizing the tube to avoid collapse thereof during superplastic forming and diffusion bonding of the multicellular core, to the exterior skin containing the tube, and to the interior skin.

Clause 19: The method of any of Clauses 12-18, further comprising a plurality of tubes, wherein the plurality of tubes are oriented parallel to one another.

Clause 20: The method of Clause 19, further comprising spacing the tubes apart by a pre-determined distance prior to their securement to the exterior skin.

The features, functions, and advantages disclosed herein can be achieved in examples presented herein, or may be provided in yet other variations, the details of which may be better appreciated with reference to the following description and drawings.

The referenced drawings are not necessarily to scale, and any disclosed examples are illustrated only schematically. Aspects of disclosed examples may be combined with or substituted for one another, and within various systems and environments that are neither shown nor described herein. As such, the following detailed description is merely exemplary, and not intended to be limiting in either application or use.

DETAILED DESCRIPTION

The following detailed description includes apparatus and methods for carrying out the present disclosure. Actual scope of the disclosure is as defined in the appended claims.

Figure 1:
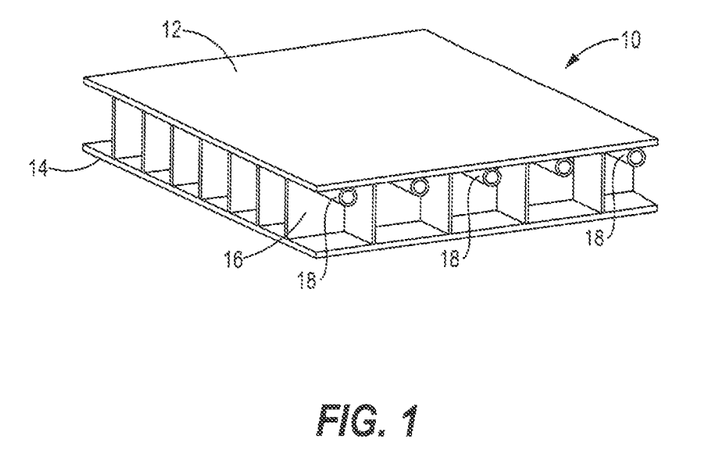
FIG. 1 is a perspective view of one example of an exterior panel for use as an aerodynamically exposed surface of a hypersonic transport vehicle, constructed in accordance with the present disclosure.

FIG. 1 displays an example of an exterior panel 10 that may be useful as an exterior surface of a hypersonic transport vehicle. The exterior panel 10 includes an exterior skin 12, an interior skin 14, and a multicellular core 16. A plurality of fluid conveying cooling tubes 18 extend through the multicellular core 16, and are fixed to the exterior skin 12 to facilitate cooling of the exterior panel 10, and particularly of the exterior skin 12 thereof which is subject to greatest amount of heat flux generated by hypersonic travel through an atmosphere. As disclosed herein, and among other possibilities, the fluid may be a cooling gas or liquid, including a fuel used to power such a transport vehicle.

Figure 2:
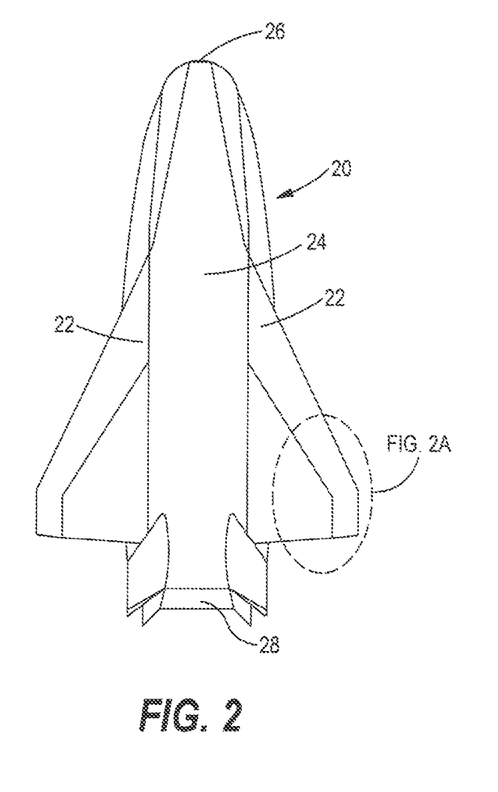
FIG. 2 is a perspective view of a hypersonic transport vehicle of the type that may employ the exterior panel of FIG. 1.
Figure 2A:
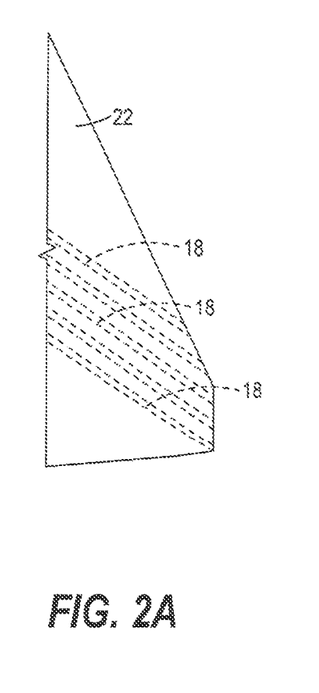
FIG. 2A is an enlarged view of an inset portion of FIG. 2, schematically depicting an array of integral tubes (in phantom) for conveying cooling fluids through a plurality of exterior panels, in accordance with an example of the present disclosure.

Referring now also to FIG. 2, an exemplary passenger-carrying hypersonic transport vehicle 20 incorporates structural frame members, including a pair of wings 22, that support the transport vehicle 20 in flight. The transport vehicle 20 includes a fuselage 24, a nose 26, and a thrust nozzle 28 of an engine (not shown). FIG. 2A displays the inset portion of FIG. 2, including one arrangement of a plurality of tubes 18, arranged in parallel, as situated within a plurality of aligned exterior panels 10 that overlie and comprise at least a portion of the wing 22. The interior skins 14 of the exterior panels 10 in such case may be fusion welded or otherwise secured to the structural frame member, i.e. the wings 22, of the transport vehicle 20. In addition, each of the exterior panels 10 may also be fusion welded to one or more adjacent exterior panels 10.

Figure 3:
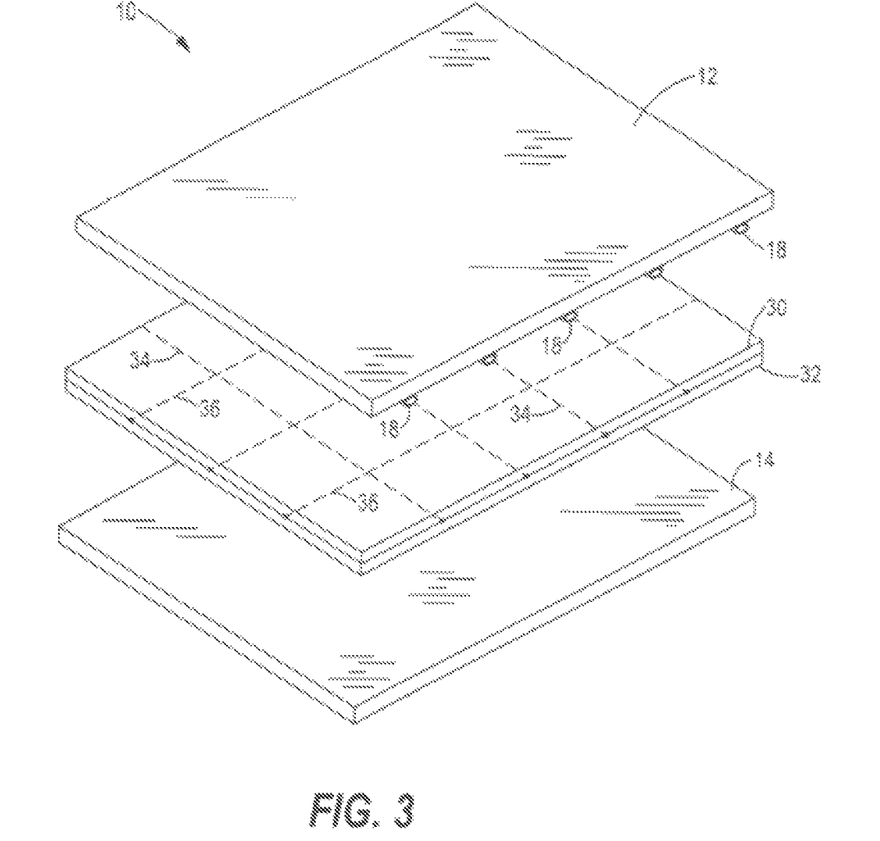
FIG. 3 is an exploded perspective view of components of the exterior panel of FIG. 1, including exterior and interior skins with upper and lower core sheets sandwiched between the skins, during an initial manufacturing step.

FIG. 3 depicts the above-described components of the exterior panel 10, including the exterior skin 12, the tubes 18, and the interior skin 14, prior to formation of the multicellular core 16. In the disclosed example of FIG. 1, the core 16 of the exterior panel 10 is constructed of a pair of upper and lower core sheets 30, 32 (FIG. 3), consisting of a superplastic material, such as a titanium alloy. Formation of the core 16 occurs during a process of superplastic forming and diffusion bonding (SPF/DB) of the core sheets 30, 32 to the exterior skin 12, the tubes 18, and the interior skin 14, within a containment box, such as a superplastic forming press further described below, to assure permanent integration of the core 16 with the exterior and interior skins 12, 14. For this purpose, the upper and lower core sheets 30, 32 are initially fusion welded together along first and second arrays 34, 36 of intermittent seam welds. The intermittent seam welds are essentially spot welds, resulting in small vent holes for balancing gas pressure during the SPF/DB manufacturing process. The first and second arrays 34, 36 are orthogonally oriented relative to each other in a predetermined pattern, such that application of gas pressure between the core sheets 30, 32 will create a multicellular core having uniformly arranged individual cells, as will be detailed below.

Titanium is a material that is both superplastic and suitable for diffusion bonding. Thus, the term "SPF/DB" as applied herein means a manufacturing process in which occurs a solid-state joinder of metallic surfaces under application of heat and pressure for a time duration sufficient to create a co-mingling of atoms at the joint interface of parts being bonded. As such, the SPF/DB process involves a diffusion process during superplastic expansion, but short of causing the joined surfaces to physically melt. In contrast, fusion bonding or welding, as applied herein, refers to metallurgical joining of metallic surfaces by applying sufficient heat to cause the materials at their joint interface to physically melt, i.e. to reach a liquid or plastic state while being joined together.

Figure 4:
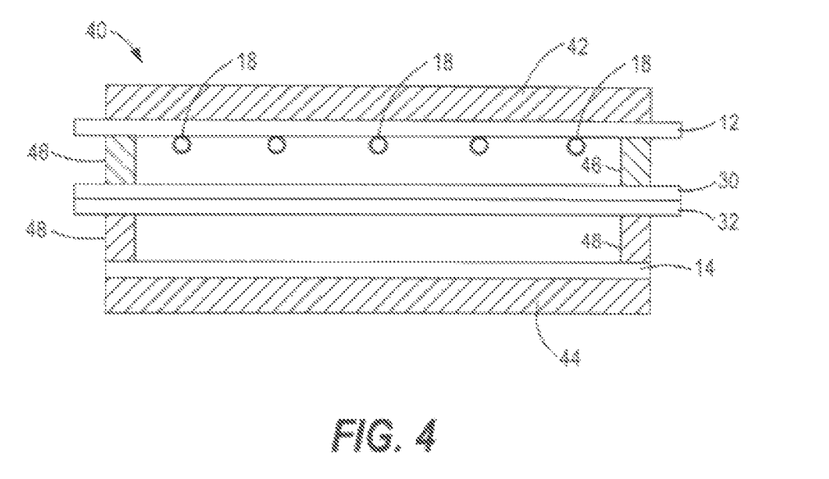
FIG. 4 is a cross-sectional side view of a forming fixture containing the components of FIG. 3, during manufacture of the exterior panel.

Referring now to FIG. 4, a fixture 40 can be used to contain the components of FIG. 3. The fixture 40 is defined by an upper frame member 42 and a lower frame member 44 to directly support the respective exterior and interior skins 12, 14. Upper and lower spacers 46, 48 are used as standoff supports to assure a predetermined desired spacing between the exterior and interior skins 12, 14, while the core sheets 30, 32 are transformed under the high pressure, high temperature SPF/DB manufacturing process into the multicellular core 16 of the exterior panel 10. Although use of standoff supports 46, 48 are shown in the disclosed fixture 40, manufacturing without such standoff supports may also be viable.

Figure 5:
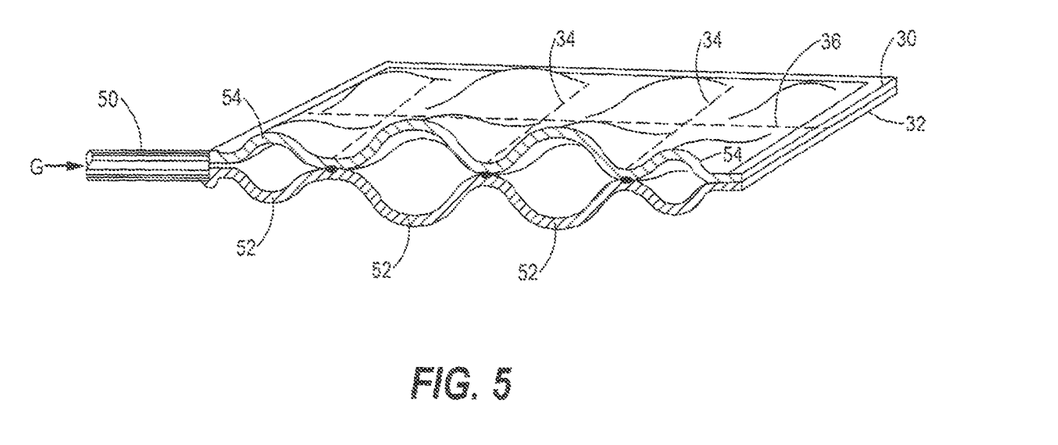
FIG. 5 is a schematic perspective view of how the core sheets may appear during their expansion in the manufacture of the exterior panel.
Figure 6:
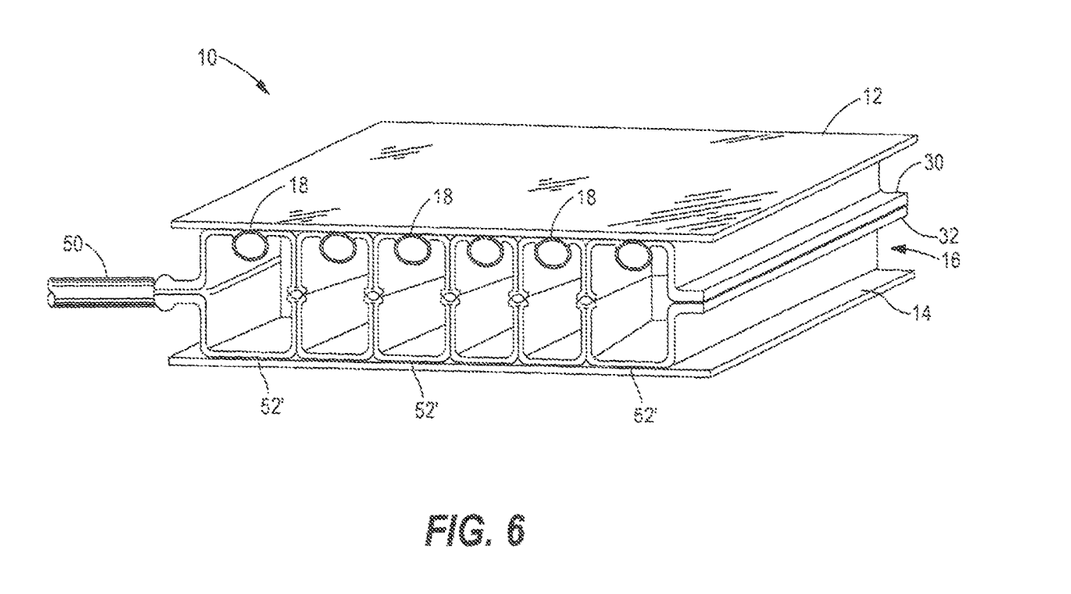
FIG. 6 is a perspective view of an exterior panel just after its manufacture, displaying a multicellular core created from upper and lower core sheets that have been fully expanded between the exterior and interior skins.

Referring now to FIG. 5, a perspective cross-sectional view of the upper and lower core sheets 30, 32 is shown during manufacture, after an expansion pipe 50 has been secured by fusion welding to one edge. The perimeter edges of the core sheets 30, 32 are then bonded together, and an inert gas G is supplied at a high pressure into the expansion pipe 50. Referring now also to FIG. 6, the pressure of the gas G on first and second arrays 34, 36 of intermittent seam welds produces bulged out portions 52 of the lower core sheet 32, and corresponding bulged out portions 54 of the upper core sheet 30, and ultimately transforms the core sheets into fully formed cell structures 52' (FIG. 6) of the multicellular core 16 (FIG. 6). Moreover, it should be appreciated that visible lines of delineation or demarcation between components, i.e. of the exterior skin 12, the tubes 18, the interior skin 14, along with the upper and lower core sheets 30, 32, all as schematically displayed in FIG. 6, are only for the purpose of describing how the components fit together after the SPF/DB manufacturing process. Indeed, after such manufacture of the exterior panel 10, any cross-section taken will reveal no visible lines of demarcation, as the components will have then become integrally bonded together into a unified structure.

Continuing reference to FIG. 6, it will be appreciated that individual cells 52' of the core 16 of the superplastic formed and diffusion bonded exterior panel 10 are constrained by the intermittent seam welds of each of the first and second arrays 34, 36, the upper exterior skin 12, the lower interior skin 14, and the tubes 18. In the described example, the tubes 18 may be tack welded or fusion welded to the exterior skin 12 prior to admission of the inert gas G.

It should be noted that the tubes 18 do not necessarily have to be formed of a titanium alloy. Other alloys, such as a nickel alloy, e.g. Inconel 718, may be used as effectively. The latter material is also superplastic formable and diffusion bondable and retains strength under high temperatures.

Figure 7:
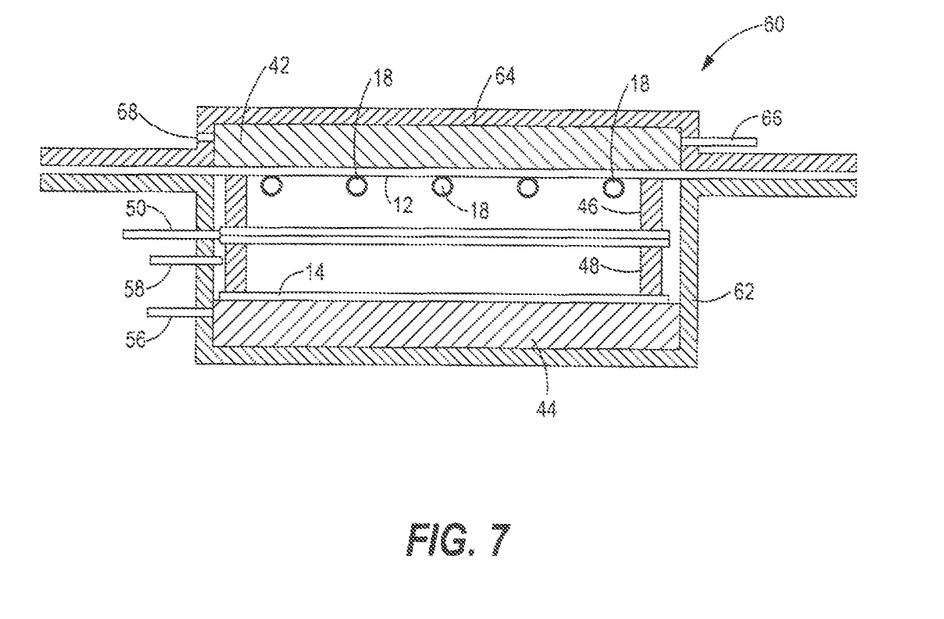
FIG. 7 depicts a pressure containment box for the fixture of FIG. 4, as used to accommodate a superplastic forming and diffusion bonding process to manufacture the exterior panel of this disclosure.

Referring now also to FIG. 7, a pressure containment device, such as a superplastic forming press 60, includes a lower member, such as a containment box 62, and an upper member, such as a containment box cover 64, configured to be secured to the containment box 62. It will be appreciated that the fixture 40 of FIG. 4, containing above-described individual components of a pre-manufactured exterior panel 10 (FIG. 3), is inserted into the superplastic forming press 60 to manufacture each completed exterior panel 10 via SPF/DB process. For this purpose, an inert gas G, such as argon, may be used to form the exterior panel 10, particularly if such structure is comprised of titanium alloy components. Other inert gases may be appropriate for titanium components, or when other components besides titanium are included.

Continuing reference to FIG. 7, prior to pressuring the superplastic forming press 60, a purging of atmospheric air from the superplastic forming press 60 is first conducted, using an noncorrosive gas such as argon, since atmospheric air can be corrosive at SPF/DB manufacturing temperatures of nearly 1700° F. For this purpose, purging and vacuum tubes such as a vacuum tube 56, a lower purge tube 58, an upper purge tube 66, and a purge vent 68, are all schematically shown as exemplary structures for accommodating the pre-manufacturing purging. After each SPF/DB manufacture of an exterior panel 10 is completed, the finished exterior panel 10 (e.g., FIG. 1) is removed from the superplastic forming press and trimmed. Thus, FIG. 1 depicts a completed, fully trimmed, exterior panel 10, i.e. having been removed from the superplastic forming press 60 and the fixture 40, and with the expansion pipe 50 removed.

It may be noted that during hypersonic flight steady-state operating temperatures of the exterior skin 12 of an exterior panel 10 made of titanium alloy may in some cases range higher than 1200° F. The exterior skin 12 may have a thickness ranging from 5 thousandths inch up to approximately 60 thousandths inch. The thickness of the core sheets 30, 32 may be in the range of 1 mm or 40 thousandths inch, and the interior skin 14 may have a thickness comparable to or somewhat less than that of the exterior skin 12. The pressure of gas G may range from 200 to 500 psi during the SPF/DB manufacturing process.

Figure 8:
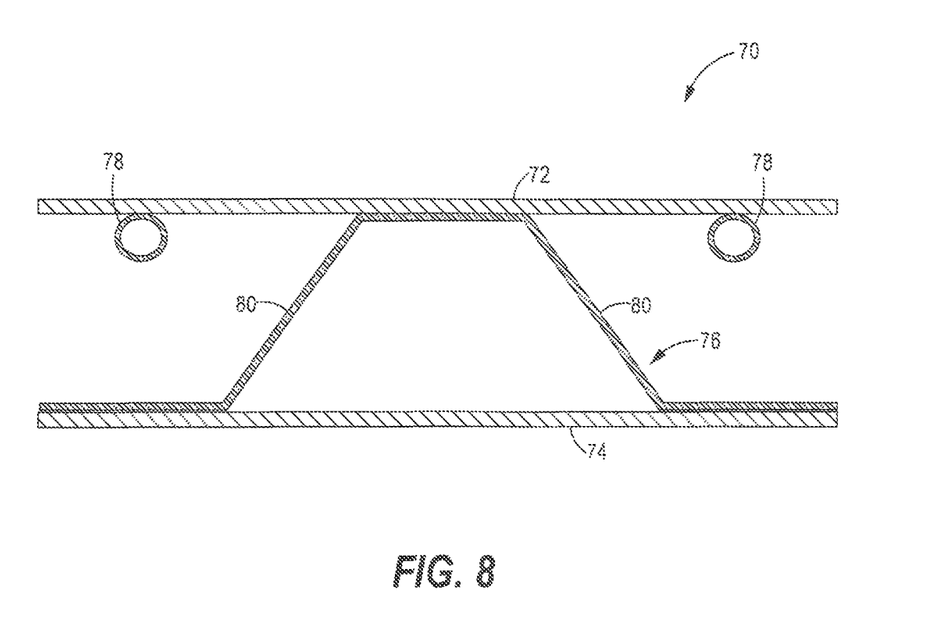
FIG. 8 is a cross-sectional view of another example of an exterior panel in which the expanded multicellular core is a modified truss-style system, instead of the rectilinear multicellular core of FIG. 1.

Referring now to FIG. 8, another example of an exterior panel 70 contains an exterior skin 72, an interior skin 74, and a plurality of fluid conveyance tubes 78. However, the core is an expanded modified truss-style multicellular core 76, formed using the SPF/DB manufacturing process, although utilizing different array patterns of intermittent welds (not shown). Unlike the first described example, however, the multicellular core 76 is formed of a single core sheet 80, as shown. The latter, however, is bonded to both exterior and interior skins 72, 74, instead of to each other as in the above-described exterior panel 10.

Figure 9:
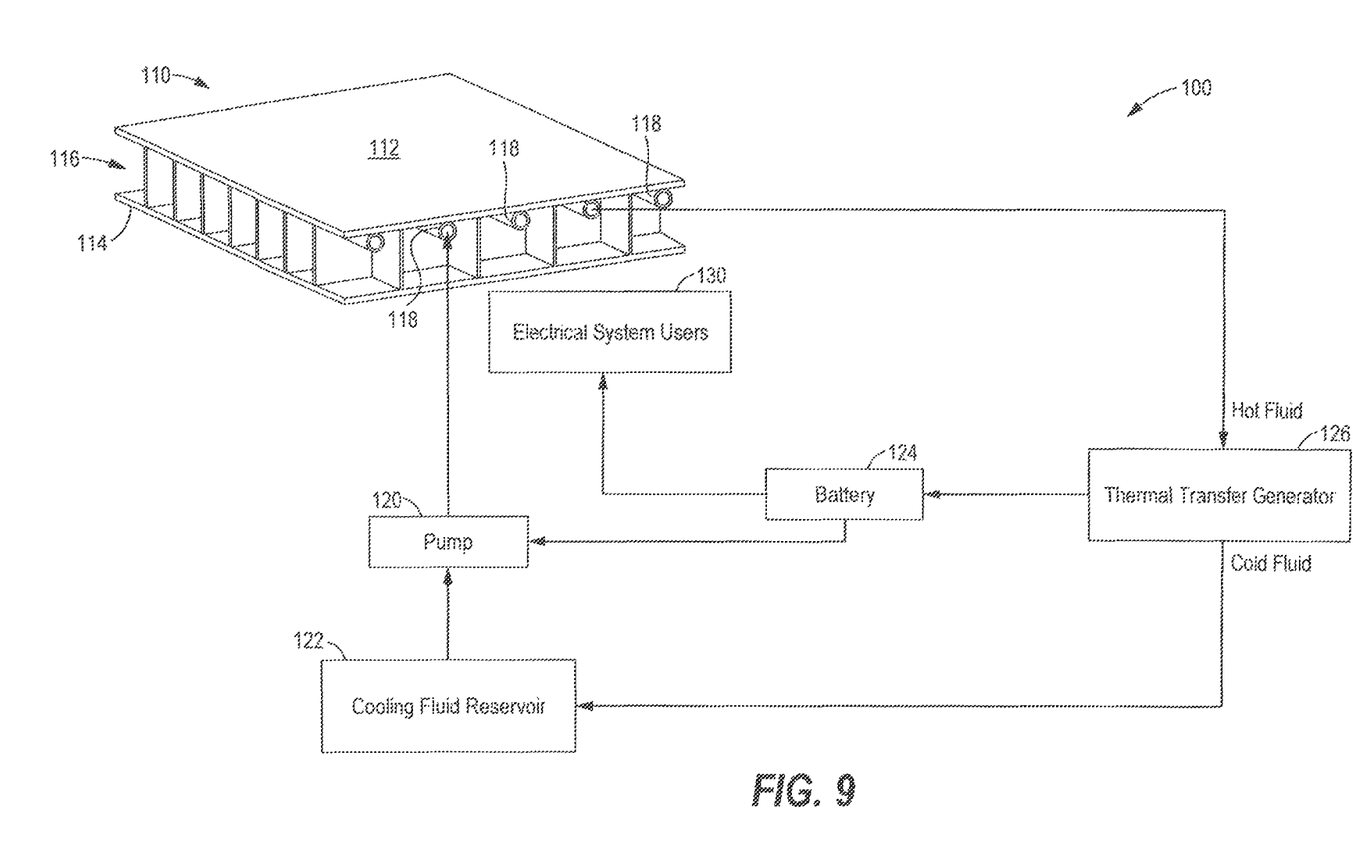
FIG. 9 depicts an example of a thermal management system that utilizes the disclosed exterior panels.

In FIG. 9, an example of a gas or liquid cooling system that may utilize one of the disclosed exterior panels 10, 70, is displayed schematically. Thus, a thermal management system 100 includes an exterior panel 110 formed of an exterior skin 112 and an interior skin 114. A multicellular core 116 is shown interposed between the exterior and interior skins 112, 114. A plurality of coolant fluid tubes 118 extend through the exterior panel 110 as shown, the tubes being secured to the exterior skin 112. As schematically shown, some of the coolant fluid tubes 118 may be utilized to supply cooled fluid, while others may be utilized to remove heated fluid.

In the thermal management system 100, a pump 120 moves cooled fluid from a cooling fluid reservoir 122 into the tubes 118 designated for the cooled fluid. Upon thermal transfer of heat into the cooled fluid, the heated fluid exits the tubes 118 designated for removal of heated fluid, and flows into a thermal transfer generator 126, effectively a heat exchanger, where heat is transferred therefrom before returning to the cooling fluid reservoir 122, as shown. Energy from the thermal transfer generator 126 may be utilized to supply a battery 124, which may, in turn, run the pump 120, as well as provide electrical power to various electrical system users 130.

Figure 10:
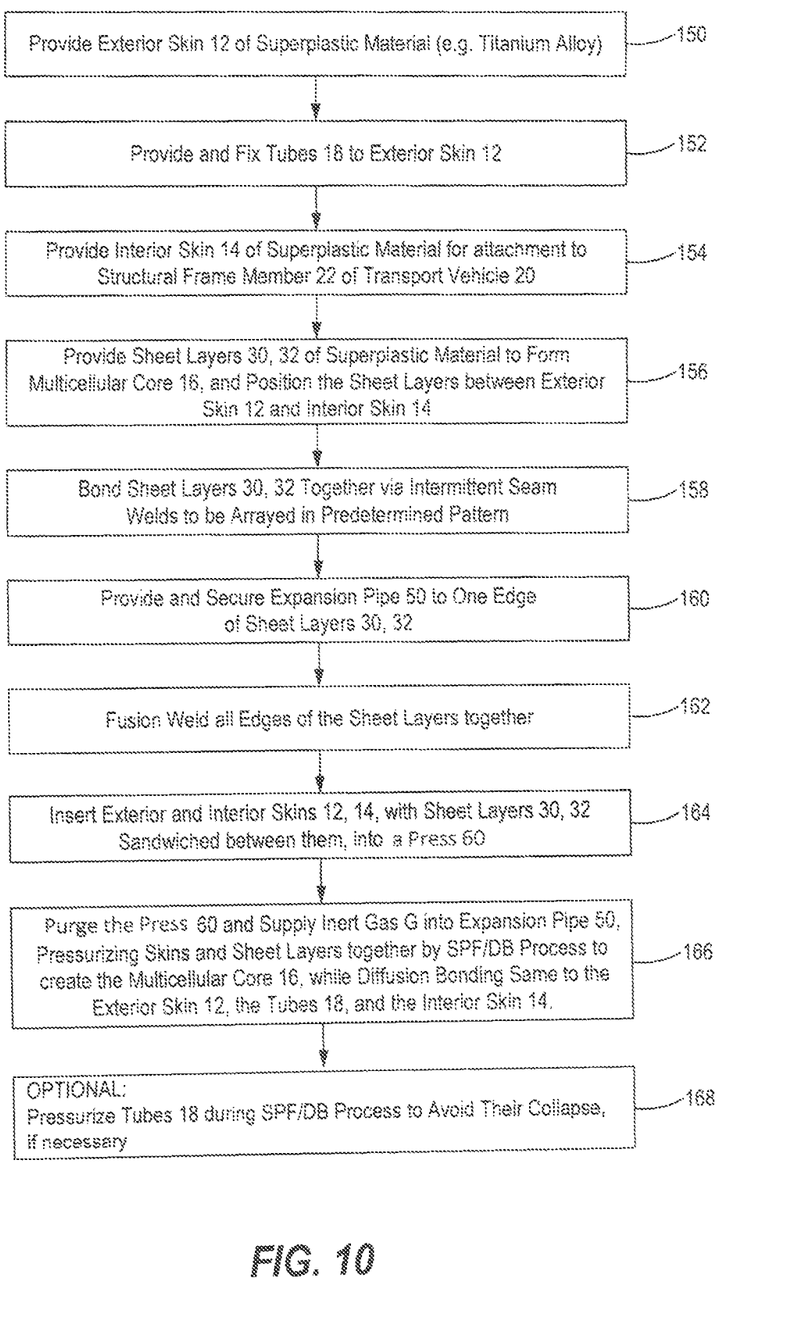
FIG. 10 displays a sequence of method steps for making the exemplary exterior panel of FIG. 1.

Referring now to FIG. 10, a method of making the exemplary exterior panel 10 (of FIG. 1) for a transport vehicle 20 (FIG. 2) includes a step 150 of providing an exterior skin 12 of a superplastic material (e.g. a titanium alloy) configured for atmospheric exposure. The method further provides a step 152 of fixing a plurality of tubes 18 to the exterior skin 12, and a step 154 of providing an interior skin 14. It should be noted that the tubes 18 will be at least frictionally juxtaposed against the exterior skin 12 when placed into the superplastic forming press 60. As such, the tubes 18 do not necessarily have to be physically bonded to the exterior skin 12 in advance. The interior skin 14 is also of a superplastic material, and is configured for attachment to a structural frame member such as a wing 22 of the transport vehicle 20. The method next includes the step 156 of providing a pair of core sheets 30, 32, also of a superplastic material, for forming a multicellular core 16 between the exterior skin 12 and the interior skin 14. Next, in accordance with step 158, the core sheets 30, 32 are bonded together via intermittent seam welds arrayed in a predetermined pattern, as exemplified by arrays 34 and 36 (FIG. 3).

In accordance with step 160, an expansion pipe 50 is next secured to one edge of the core sheets 30, 32, and in step 162 a continuous weld is then applied about all edges of the layers. In step 164, the exterior and interior skins 12, 14 are inserted along with the core sheets 30, 32 into the fixture 40, which is then placed into a pressure containment device, such as the superplastic forming press 60. In step 166, the superplastic forming press 60 is purged, and an inert gas G is supplied into the expansion pipe 50 to superplastic pressurize the skins and layers to create the multicellular core 16 that becomes integrally bonded to the exterior skin 12, the tube 18, and to the interior skin 14. In an optional step 168, the tubes 18 are pressurized during the SPF/DB process to avoid their collapse, if necessary.

In the completed SPF/DB structure, the tubes 18 extend entirely through the exterior panel 10 as an integral part thereof. Each tube 18 may be prefabricated to desired specifications, e.g. of ¼ inch diameter with a wall thickness of at least ⅛ inch for withstanding anticipated compressive pressures ranging from 200 to 500 psi during the SPF/DB process. Moreover, it is noted herein that the superplastic forming press 60 can be modified to accommodate use of relatively thinner walled tubes 18, e.g. less than 1/16 inch. In such cases, a system of plugs and separate pressure sources (not shown) may be applied to the tubes 18 to avoid their potential collapse under the noted pressures of the SPF/DB manufacturing process. The latter is the basis for the optional step 168 of FIG. 10.

Although only a few examples and method steps have been described herein, this disclosure may admit to yet other variations and modifications neither described nor suggested. For instance, although not described above, the exterior panel 10, 70 may have other multicellular core configurations, resulting in significantly lighter, simpler, and less costly structures. Moreover, inert gases other than argon may be utilized in the SPF/DB process to manufacture the exterior panels 10, 70. In addition, although heavier, a nickel alloy such as Inconel 718 could be used in place of the described titanium examples for applications requiring protection from exposure to temperatures approaching 1500° F.

Finally, several other viable and convenient methods can be envisioned for manufacturing the exterior panels 10, 70, as may be appreciated by those skilled in the art.

What is claimed is:

1. An exterior panel for a transport vehicle, the exterior panel comprising:
    an exterior skin configured for atmospheric exposure;
    an interior skin attachable to a structural frame member of the transport vehicle;
    a multicellular core sandwiched between the exterior skin and the interior skin; and
    a tube extending through the multicellular core, wherein the tube conveys a cooling fluid;
    wherein the multicellular core is superplastic formed and diffusion bonded to the exterior skin, and the interior skin;
    wherein the tube is separate piece from the exterior skin which underlies the exterior skin, and is diffusion bonded together at a joint interface of the tube and the exterior skin to form an unitary structure, and wherein the tube traverses and is integral with the multicellular core adjacent the exterior skin.

2. The exterior panel of claim 1, wherein the tube, the multicellular core, and the exterior skin are diffusion bonded together at a joint interface of the tube, the multicellular core, and the exterior skin to form the unitary structure.

3. The exterior panel of claim 1, wherein the exterior skin, the interior skin, and the multicellular core, are formed of a titanium alloy.

4. The exterior panel of claim 3, wherein the titanium alloy is a superplastic capable titanium alloy.

5. The exterior panel of claim 1, wherein the cooling fluid is a fuel.

6. The exterior panel of claim 1, wherein the tube conveys a cooling gas or a liquid to remove heat from the exterior panel.

7. The exterior panel of claim 1, wherein the exterior panel is secured to a wing of the transport vehicle.

8. A method of manufacturing the exterior panel of claim 1,
    the method comprising:
    providing the exterior skin of a superplastic material;
    disposing the tube proximate to the exterior skin to fix the tube to the exterior skin;
    providing the interior skin of a superplastic material;
    providing at least one core sheet layer of a superplastic material to form the multicellular core between the exterior skin and the interior skin; and
    installing the exterior skin and the interior skin with the at least one core sheet layer into a pressure containment device, supplying an inert gas into an expansion pipe to superplastic form and diffusion bond the exterior skin, the interior skin, and the at least one core sheet layer together at a joint interface of the exterior skin, the interior skin, and the at least one core sheet layer, creating the multicellular core that is integrally bonded to the exterior skin, the tube, and the interior skin to form the unitary structure;

wherein the tube extends through the exterior panel.

9. The method of claim 8, further comprising bonding a second core sheet to the at least one core sheet via intermittent seam welds, securing the expansion pipe to one edge of the layers, and applying a continuous weld about edges of the layers.

10. The method of claim 8, wherein the tube conveys the cooling fluid, including a fuel.

11. The method of claim 8, wherein the tube is formed of a titanium alloy.

12. The method of claim 8, wherein the tube is formed of a nickel alloy.

13. The method of claim 8, further comprising pressurizing the tube to avoid collapse thereof during superplastic forming and diffusion bonding of the multicellular core, to the exterior skin containing the tube, and to the interior skin.

14. The method of claim 8, wherein the tube further defined as a plurality of tubes oriented parallel to one another.

15. The method of claim 14, further comprising spacing the tubes apart by a pre-determined distance prior to fixing the tubes to the exterior skin.

16. A transport vehicle having at least one exterior panel, the at least one exterior panel comprising:

an exterior skin configured for atmospheric exposure;

an interior skin attachable to a structural frame member of the transport vehicle;

a multicellular core imparts tensile and compressive strength to the exterior panel, the multicellular core being sandwiched between the exterior skin and the interior skin; and at least one tube extending through the multicellular core and the at least one tube is a separate piece from the exterior skin which is joined to an underside of the exterior skin, wherein the at least one tube conveys a cooling fluid;

wherein the multicellular core is superplastic formed and diffusion bonded to the exterior skin and the interior skin, and wherein the at least one tube is diffusion bonded together at a joint interface of the at least one tube and the exterior skin to form an unitary structure.

17. The transport vehicle of claim 16, wherein the at least one exterior panel is further defined as a plurality of exterior panels, and wherein the transport vehicle is a hypersonic vehicle having the plurality of exterior panels, and wherein each of the exterior panels is joined to at least one other of the exterior panels by fusion welding.

18. The transport vehicle of claim 17, wherein the at least one tube is further defined as a plurality of tubes, and each of the exterior panels includes at least one of the tubes that underlies the exterior skin of a respective one of the exterior panels, and is diffusion bonded together at the joint interface of the at least one of the tubes and the exterior skin of the respective one of the exterior panels to form the unitary structure, and wherein the at least one of the tubes of the respective one of the exterior panels traverse through, and is integral with, the multicellular core adjacent the exterior skin of the respective one of the exterior panels.

19. The transport vehicle of claim 16, wherein the exterior skin, the interior skin, and the multicellular core of the at least one exterior panel are formed of a superplastic capable titanium alloy.

* * * * *

UNITED STATES PATENT AND TRADEMARK OFFICE
CERTIFICATE OF CORRECTION

PATENT NO. : 11,492,095 B2
APPLICATION NO. : 16/557613
DATED : November 8, 2022
INVENTOR(S) : Corey Vasel It is certified that error appears in the above-identified patent and that said Letters Patent is hereby corrected as shown below:

In the Claims

Claim 1, Column 8, Line 30: "skin, and" should read --skin and--;
Claim 1, Column 8, Line 32: "is separate" should read --is a separate--;
Claim 9, Column 9, Line 9: "second core sheet" should read --second core sheet layer--;
Claim 9, Column 9, Line 9: "one core sheet" should read --one core sheet layer--;
Claim 9, Column 9, Line 11: "the layers," should read --the core sheet layers,--;
Claim 9, Column 9, Line 12: "the layers." should read --the core sheet layers.--.

Signed and Sealed this
Second Day of April, 2024

Katherine Kelly Vidal
*Director of the United States Patent and Trademark Office*